P. H. JOHNSTON.
MOUNTING FOR OPHTHALMIC LENSES.
APPLICATION FILED NOV. 9, 1916.
1,243,743.
Patented Oct. 23, 1917.
2 SHEETS—SHEET 1.
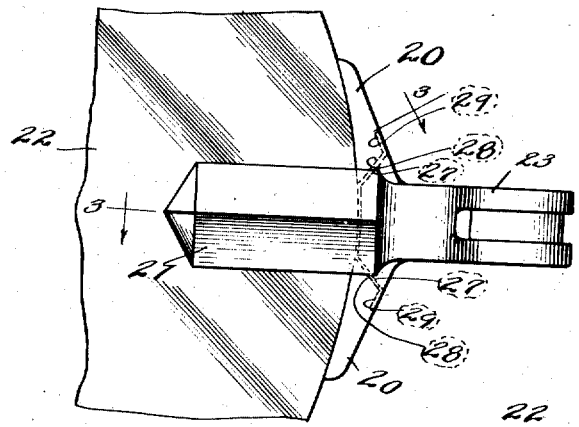
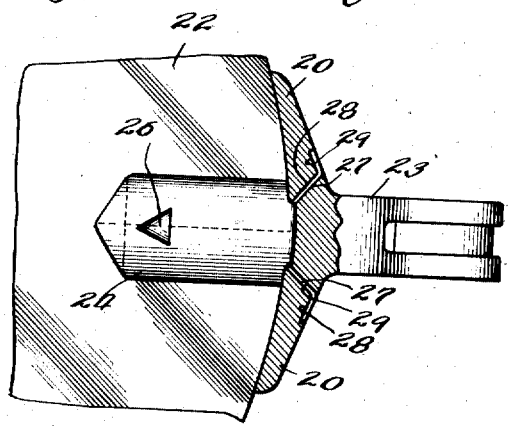
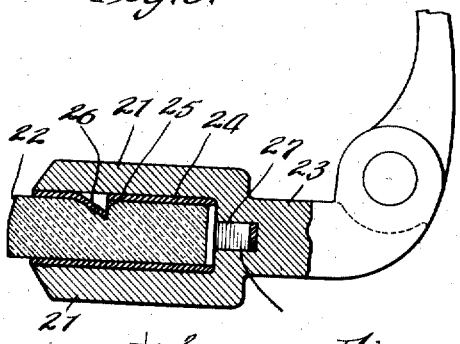
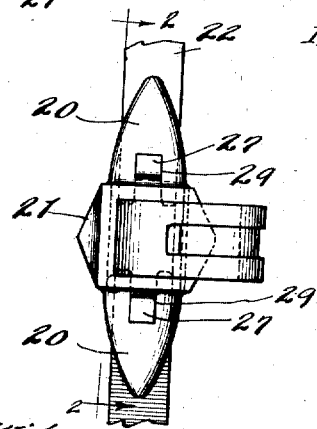
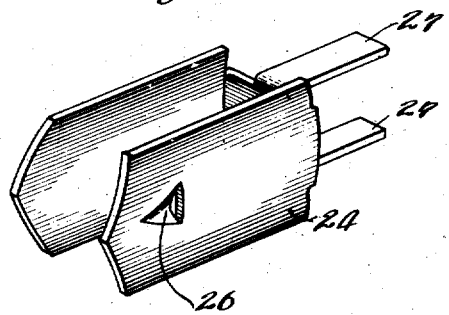
Witnesses,
H. J. Barrett.
INVENTOR.
Paul H. Johnston
BY
Benjamin, Roadhouse & Lund
ATTORNEYS.

P. H. JOHNSTON.
MOUNTING FOR OPHTHALMIC LENSES.
APPLICATION FILED NOV. 9, 1916.

1,243,743.

Patented Oct. 23, 1917.
2 SHEETS—SHEET 2.

WITNESSES:

INVENTOR.
Paul H. Johnston
BY
Benjamin, Roadhouse & Lundy
ATTORNEYS.

UNITED STATES PATENT OFFICE.

PAUL H. JOHNSTON, OF DAVENPORT, IOWA.

MOUNTING FOR OPHTHALMIC LENSES.

1,243,743.   Specification of Letters Patent.   Patented Oct. 23, 1917.

Application filed November 9, 1916. Serial No. 130,494.

*To all whom it may concern:*

Be it known that I, PAUL H. JOHNSTON, a citizen of the United States, and a resident of the city of Davenport, county of Scott, and State of Iowa, have invented certain new and useful Improvements in Mountings for Ophthalmic Lenses, of which the following is a specification.

My present invention relates to improvements in mountings for ophthalmic lenses, and has special reference to the instrumentalities for securing the lenses to the mountings. The object of my present invention is the provision of an extremely simple and dependable lens attachment and also the provision of such an attachment which will readily compensate for differences of thicknesses in lenses and will hold the lenses snugly in the mount.

I prefer to accomplish my above object with the instrumentalities and in the manner illustrated in the accompanying drawing, in which,—

Figure 1 is a front elevation of a form of mounting for securing a temple to a spectacle lens, a fragment of a lens being shown in assembly therewith.

Fig. 2 is a view similar to Fig. 1, the near lens ear being removed and the lens strap being sectioned to show the relation of the attaching shim to the lens and mount;

Fig. 3 is a horizontal central section of the structure shown in Fig. 1;

Fig. 4 is an end or side elevation of the structure shown in Fig. 1;

Fig. 5 is a perspective view of the attaching shim;

Similar reference characters refer to similar parts throughout the several views.

A typical ophthalmic lens mount consists of a lens strap, 20, adapted to conform to and contact the periphery of a lens adjacent the end of its horizontal axis. Lens ears, 21, extend from the central portion of the lens strap upon either side or surface of the lens, 22, and a stud or other attachment, 23, extends oppositely from the lens ears, at their juncture with the lens strap.

For the purpose of securing the lens to the lens ears and strap, I provide a U-shaped shim, 24, adapted to be interposed between the lens and the lens ears and the under surface of the lens strap between the ears. A depression, 25, is provided in the lens, preferably of a conical form, with the base of the cone nearer to the adjacent periphery of the lens, and I also provide a projection, 26, upon the shim adapted to register with and extend into the depression, 25, in the lens.

Extending from each edge of the base of the U-shaped shim, 24, is a tongue, 27, and punched in the lens strap, 20, are two openings, 28, 28, through which the tongues, 27, are adapted to extend. Preferably the outer face of the lens strap is countersunk or depressed at 29 adjacent the openings 28 (as clearly shown in Figs. 2 and 8), so that the ends of the tongues, 27, may be bent down therein, so that the exposed surfaces of the tongues, when so bent down, will lie flush with the surface of the lens strap.

Figure 10:
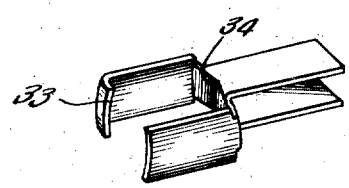
Fig. 10 is a perspective of a slightly modified form of attaching shim, preferably employed with the structure shown in Fig. 6.

The portions of the shim adapted to contact the surfaces of the lens are preferably dished, as shown in Figs. 5 and 10, so as to give them an elastic contact with the lens. The elasticity thus provided by dishing the parallel arms of the shim also provides compensation for different thicknesses of the lenses.

The slightly modified form of mounting shown in Figs. 6 to 9, inclusive, is particularly adapted for lenses having extensions, 30, adjacent the ends of their horizontal axes for assembly with the mount. In this form the lens ears are modified into plates, 31, extending between the curved or diverging edges of the lens strap, which forms a box into which the extension, 30, of the lens is inserted.

Figure 6:
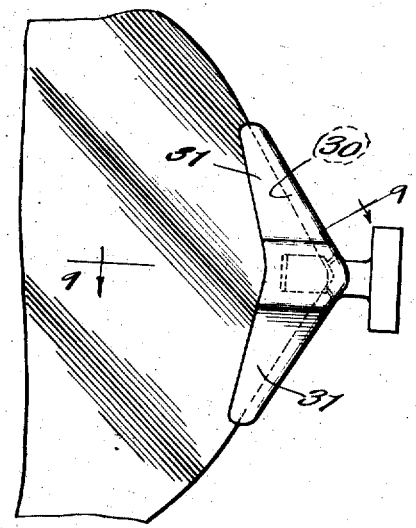
Fig. 6 is a view similar to Fig. 1, but of a slightly modified form of mounting which may be employed for securing either a temple or a bridge to the lens.
Figure 7:
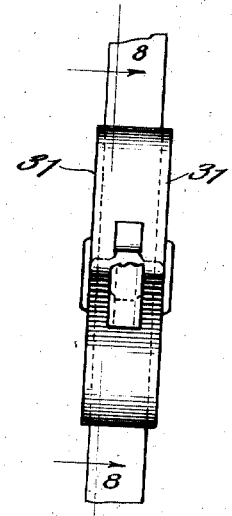
Fig. 7 is an end or side elevation of the structure shown in Fig. 6.
Figure 8:
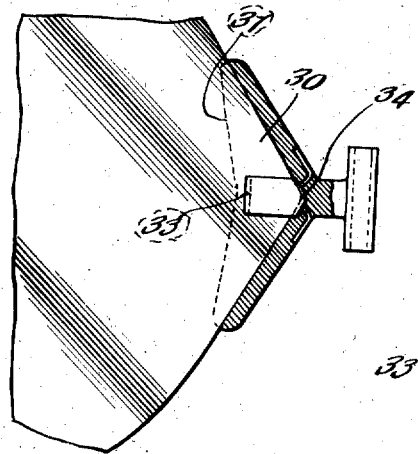
Fig. 8 is a view similar to Fig. 2, but of the structure shown in Fig. 6.
Figure 9:
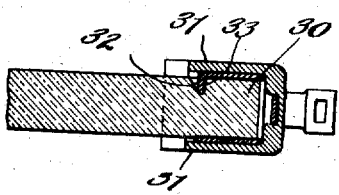
Fig. 9 is a central horizontal section of the structure shown in Fig. 6.

In this form an indentation, 32, in the lens, similar to the depression, 25, is also employed, but as there is not the same length to the plate, 31, as there is to a lens ear, I prefer to turn over an end, 33, of one of the parallel arms of the shim, as shown in Figs. 9 and 10, to engage the indentation, 32. In this form also the base of the U-shaped shim, as at 34 in Figs. 8 and 10, is given the necessary shape to conform to the extension 30 on the lens.

In all other respects the modified form shown in Figs. 6 to 10, is precisely similar to the structure shown in Figs. 1 to 6.

In both forms of structure herein shown and described, cement may be advantageously employed, although after the shim has been assembled with the lens and the mounting placed over it, the shim cannot let go until the mounting is removed, and when the tongues, 27, are turned down upon the back of the lens strap, the mounting cannot be withdrawn until the tongues are disengaged.

Having described my invention, what I claim as new and desire to secure by Letters Patent is:

1. A mounting for lenses comprising a member adapted to receive the edge and extend upon opposite surfaces of a lens, a shim adapted to be interposed between said member and a lens and interlock with said lens, and a tongue carried by said shim and adapted to extend through the walls of said member and interlock therewith.

2. A mounting for lenses comprising a member adapted to receive the edge and extend upon opposite surfaces of a lens, a shim adapted to be interposed between said member and a lens and interlock with said lens, and tongues carried by said shim and adapted to extend through the walls of said member and interlock therewith.

3. A mounting for lenses comprising a member adapted to receive the edge and extend upon opposite surfaces of a lens, a shim adapted to be interposed between said member and a lens, and tongues carried by said shim and adapted to extend through the walls of said member and interlock therewith.

4. A mounting for lenses comprising a member adapted to receive the edge and extend upon opposite surfaces of a lens, and an element of concave section interposed between said lens and said member and provided with an extension adapted to extend through said member and interlock therewith.

5. A mounting for lenses comprising a member adapted to receive the edge and extend upon opposite surfaces of a lens, and a shim having arms of concave section extended upon opposite surfaces of a lens between said lens and said member.

6. A mounting for lenses comprising a member adapted to receive the edge and extend upon opposite surfaces of a lens, and a shim having arms of concave section extended upon opposite surfaces of a lens between said lens and said member and provided with an extension adapted to extend through said member and interlock therewith.

Signed at Davenport, county of Scott, and State of Iowa, this 2d day of November, 1916.

PAUL H. JOHNSTON.

Witnesses:
EDNA TAYLOR,
AUG. A. BALLUFF.

Copies of this patent may be obtained for five cents each, by addressing the "Commissioner of Patents, Washington, D. C."